O. I. HESS.
LINK FOR ANTISKID CHAINS.
APPLICATION FILED JAN. 6, 1921.

1,432,107.

Patented Oct. 17, 1922.

O. I. Hess,
Inventor

By [signature]
Attorneys

Patented Oct. 17, 1922.

1,432,107

UNITED STATES PATENT OFFICE.

OLIVER I. HESS, OF SCOTTDALE, PENNSYLVANIA.

LINK FOR ANTISKID CHAINS.

Application filed January 6, 1921. Serial No. 435,442.

*To all whom it may concern:*

Be it known that I, OLIVER I. HESS, a citizen of the United States, residing at Scottdale, in the county of Westmoreland and State of Pennsylvania, have invented a new and useful Link for Antiskid Chains, of which the following is a specification.

This invention relates to anti-skid chains designed for use in connection with motor vehicle wheels, it being the primary object of the invention to provide novel means for attaching the tread chains to the securing chains of the device.

A further object of the invention is to provide removable wear surfaces for the tread chains, whereby the traction and anti-side skidding qualities of the tread chains will be increased materially, while the removable wear surfaces may readily be replaced when worn out.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing.

Figure 1:
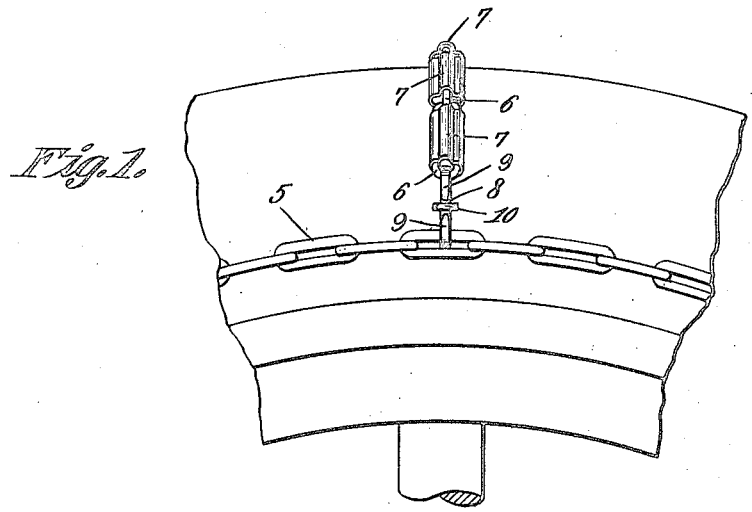
Figure 1 illustrates a fragmental side elevational view of a wheel, showing the invention as applied.
Figure 2:
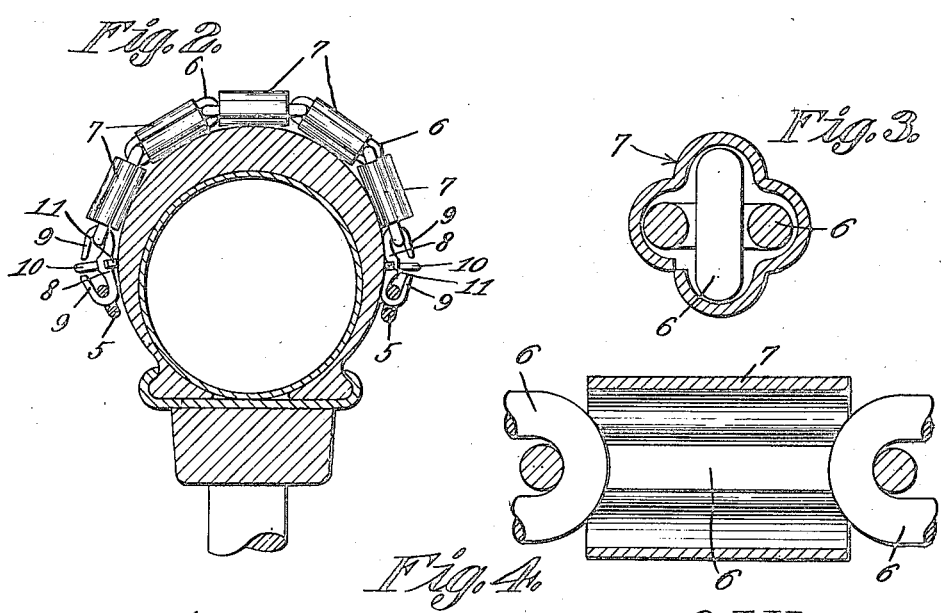
Figure 2 illustrates a sectional view taken on line 2—2 of Figure 1.

Referring to the drawing in detail, the reference character 5 designates one of the securing chains of the anti-skid device which are formed in the usual manner and supported on a tire adjacent to the felloe of the wheel.

The tread members, which form the essence of this invention include chain sections 6 formed of a plurality of straight links connected in the usual manner, there being provided removable tread surfaces 7, which are of lengths slightly shorter than the lengths of the links to which the same are applied.

Figure 3:
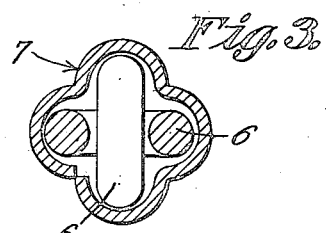
Figure 3 illustrates a transverse sectional view through one of the tread chains.
Figure 4:
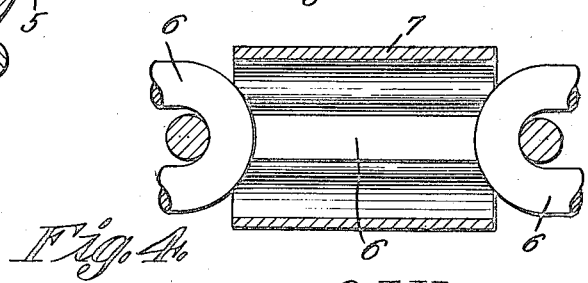
Figure 4 illustrates a longitudinal sectional view through the chain and one of the tread members.
Figure 5:
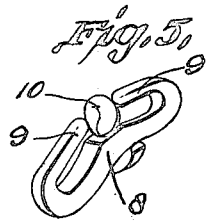
Figure 5 is a perspective view of the hook and cotter pin.

These surface members 7 are formed preferably of sheet metal material, or steel castings curved to conform to the contour of connected links, as illustrated more clearly by Figure 3 of the drawing, the ends of the material forming the surface members being brought together, at a point adjacent to the base or tire engaging surface of the tread chains.

The connecting links which connect the tread chains to the supporting chains, are of novel constructions, each of which includes a body portion 8 which is provided with a central opening, and hook members 9 formed at the respective ends thereof, the hook members having their free extremities disposed in suitable spaced relation with each other, to provide a clearance to permit the passage of a link member between the ends, so that the link members may be positioned over the hook members 9.

In order that the link members may be secured on the hook members, a cotter pin as indicated at 10 has its body portion disposed between the free ends of the hook members 9 to close the passageway between the hook members to prevent the passage of the link members from the hook members.

As shown, the leg portions of the cotter pin pass through the central opening in the body portion 8, the ends thereof being bent upwardly to grasp the sides of the body portion as at 11, whereby the pin 10 is secured to the body portion, and prevented from moving with respect thereto.

If it is desired to remove one of the tread chains, it is obvious that it is only necessary to force the ends of the cotter pin into close engagement with each other, whereby the cotter pin may be removed, and the link members of the chain which are connected thereto may be now disengaged from the hook members.

Having thus described the invention, what is claimed as new is:—

A link for anti-skid chains, said link comprising a body portion and opposed hooks having their ends disposed in spaced relation, said body portion having an opening formed intermediate its ends, a cotter pin positioned in the opening and having its head disposed between the ends of the hooks, and the ends of said cotter pin being bent upwardly into engagement with the sides of the body portion.

In testimony that I claim the foregoing as my own, I have hereto affixed my signature in the presence of two witnesses.

OLIVER I. HESS.

Witnesses:
 HARRY W. COLBORN,
 BESS B. MACMILLAN.